United States Patent
Gill (10) Patent No.: US 7,530,160 B2
(45) Date of Patent: May 12, 2009

(54) METHOD FOR MANUFACTURING A MAGNETORESISTIVE SENSOR HAVING IMPROVED ANTIPARALLEL TAB FREE LAYER BIASING

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/850,564

(22) Filed: Sep. 5, 2007

(65) Prior Publication Data
US 2007/0292607 A1      Dec. 20, 2007

Related U.S. Application Data

(62) Division of application No. 10/780,950, filed on Feb. 17, 2004, now Pat. No. 7,280,324.

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/62; 216/65; 216/66; 360/324.1; 360/324.11; 360/324.12; 360/324.2; 427/127; 427/128

(58) Field of Classification Search ... 29/603.13–63.16, 29/603.18; 216/62, 65, 66; 360/324.1, 324.11, 360/324.12, 324.2; 427/127–131
See application file for complete search history.

(56) References Cited

U.S. PATENT DOCUMENTS 7,050,277 B2 * 5/2006 Gill et al. ............... 360/324.12

* cited by examiner

*Primary Examiner*—Paul D Kim
(74) *Attorney, Agent, or Firm*—Zilka-Kotab, PC (57) ABSTRACT

A method for manufacturing a magnetoresistive sensor having improved free layer biasing and track width control. The method includes forming a ferromagnetic pinned layer, and depositing a ferromagnetic film thereover. A layer of Ta is deposited over the ferromagnetic film and a mask is formed over an active sensor area. A reactive ion etch process is performed to remove selected portions of said Ta layer. An etch is then performed to remove selected portions of the ferromagnetic film in unmasked areas and a ferromagnetic refill material is deposited.

11 Claims, 10 Drawing Sheets

METHOD FOR MANUFACTURING A MAGNETORESISTIVE SENSOR HAVING IMPROVED ANTIPARALLEL TAB FREE LAYER BIASING

RELATED APPLICATIONS

The present application is a divisional application of U.S. patent application Ser. No. 10/780,950 entitled MAGNETORESISTIVE SENSOR HAVING IMPROVED ANTIPARALLEL TAB FREE LAYER BIASING, Filed on Feb. 17, 2004 now U.S. Pat. No. 7,280,324, which is incorporated herein by reference for all purposes as if fully set forth herein.

FIELD OF THE INVENTION

The present invention relates to a spin valve read head stabilized without hard bias layers and, more particularly to an antiparallel coupled (AP) tab design for improved free layer stabilization and track width control.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic field in the pole pieces which causes flux across the gap at the ABS for the purpose of writing the aforementioned magnetic impressions in tracks on moving media, such as in circular tracks on the aforementioned rotating disk.

In recent read head designs a spin valve sensor has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. A spin valve is also known as a top or bottom spin valve depending upon whether the pinning layer is at the top (formed after the free layer) or at the bottom (before the free layer). A pinning layer in a bottom spin valve is typically made of platinum manganese (PtMn). The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

It is important that the free layer of the spin valve sensor be magnetically stable. During a typical construction of a spin valve sensor a bilayer photoresist is formed on top of multiple full film sensor layers. These full film layers are then ion milled to form the spin valve sensor with first and second side edges that are typically tapered at an angle with respect to a normal to the planes of the layers. First and second hard bias layers and first and second lead layers are then deposited with the bilayer photoresist still in place forming what is known in the art as contiguous junctions of the hard bias and lead layers with the first and second side edges of the spin valve sensor. Magnetostatic fields from the first and second hard bias layers are employed for the purpose of aligning the magnetic moments of the free layer so that they are all in the same direction in a single domain state. Without the hard bias layers the free layer would be in a multi-domain state with the magnetic domains being defined by numerous walls. The narrower the track width the greater the magnetic instability of the free layer. When the free layer is subjected to applied magnetic fields from the rotating disk the domain walls move around which creates magnetic noise that is superimposed upon the read signal.

The aforementioned process of making contiguous junctions inherently results in a taper of the first and second side edges of the layers of the sensor. Unfortunately, the greater the angle or taper of the first and second side edges of the spin valve sensor the less the effectiveness of first and second hard bias layers. When the first and second side edges of the spin valve sensor are tapered the first and second hard bias layers take on the soft magnetic properties of the free layer causing the first and second hard bias layers to be magnetically softer and less capable of applying a magnetostatic coupling for stabilizing tie free layer. The first and second hard bias layers are at their maximum effectiveness when the first and second side edges of the spin valve sensor are vertical sensor are vertical or parallel to a normal to the planes of the layers. This vertical configuration has not been obtainable with the bialayer photoresist and ion milling steps for forming the first and second side edges of the spin valve sensor. Accordingly, there is a strong-felt need for a biasing scheme to longitudinally bias the free layer into a single domain state when the first and second side edges of the spin valve sensor are tapered.

Pursuant to the above objective, attempts have been made to bias the free layer of a spin valve using antiparallel pinned tabs at side edges of the spin valve outside of the active area of the sensor. Such designs employ first and second first ferromagnetic layers formed outside of the active area of the sensor and separated by a nonmagnetic spacer layer. One of the layers is exchange coupled with an antiferromagnetic layer, very strongly pinning these ferromagnetic layers outside of the active area of the sensor. One of the ferromagnetic layers could be either exchange coupled with or contiguous with the free layer so as to strongly bias the free layer.

However, such designs have experienced challenges in stabilizing the free layer while precisely defining the track width of the sensor. As one skilled in the art may appreciate, the strong biasing that can be achieved at the outer edges of the free layer can essentially pin the outer edges of the free layer in the active area of the sensor. This pinning can decrease toward the center of the sensor leading to non-uniform biasing, and therefore, poorly defined track width.

Therefore, there remains a strong felt need for a mechanism for robustly stabilizing the free layer of a magnetoresistive sensor while precisely defining the track width of the sensor and allowing sufficient, uniform free layer sensitivity.

SUMMARY OF THE INVENTION

The present invention provides a method for manufacturing a magnetoresistive sensor having improved free layer stability and track width control. The method includes forming a ferromagnetic pinned layer, and depositing a ferromagnetic film thereover. A layer of Ta is deposited over the ferromagnetic film and a mask is formed over an active sensor area. A reactive ion etch process is performed to remove selected portions of said Ta layer. An etch is then performed to remove selected portions of the ferromagnetic film in unmasked areas and a ferromagnetic refill material is deposited.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
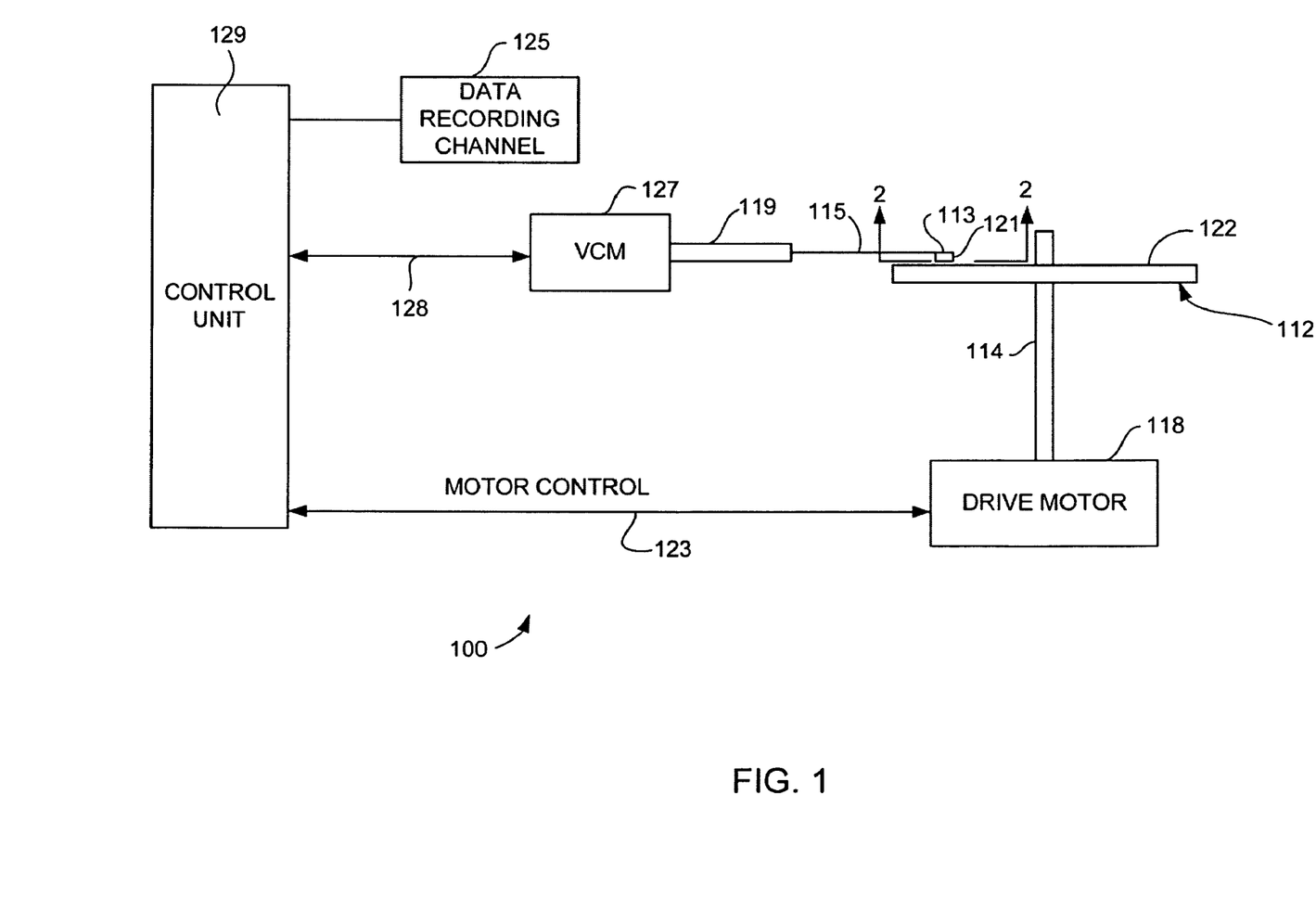
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
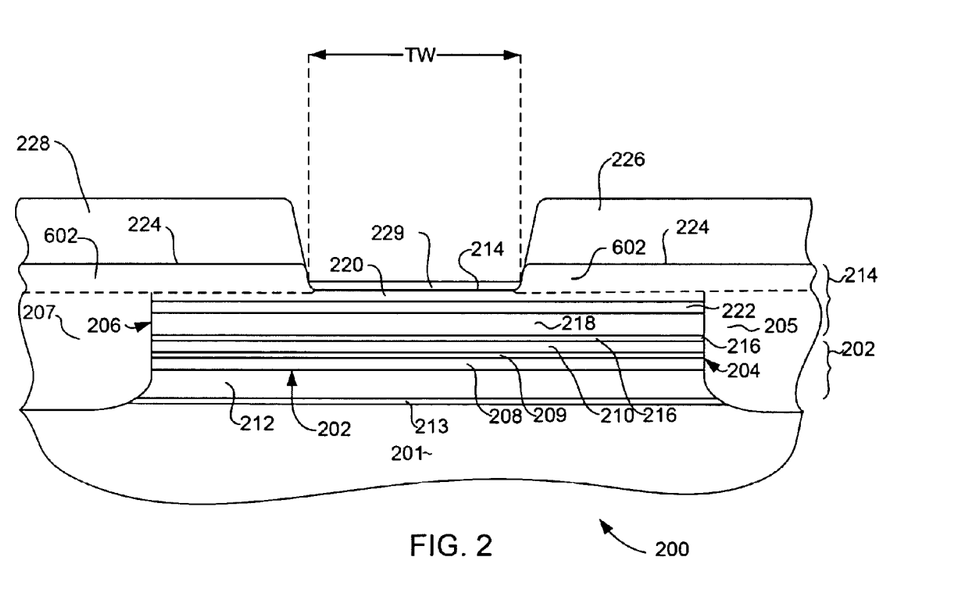
FIG. 2 is an ABS view of a magnetoresistive sensor according to an embodiment of the present invention.

With reference now to FIG. 2, a magnetoresistive sensor according to an embodiment of the present has improved track width definition and free layer stabilization. The sensor 200 is formed upon a substrate 201 such as a non-magnetic, electrically insulating gap layer and includes a pinned layer 202 that extends substantially beyond a track width TW of the sensor, terminating in laterally opposed first and second sides 204, 206. The pinned layer 202 preferably extends beyond the track width TW a distance of a least one half the track width TW. First and second layers of antiferromagnetic material 205, 207, such as for example PtMn abut the sides 204, 206 of the sensor and extend laterally therefrom. The pinned layer 202 can be an antiparallel pinned (AP Pinned) layer including first and second ferromagnetic layers 208, 210 separated by a thin, non-magnetic coupling layer 209 such as Ru. The first and second ferromagnetic layers 208, 210 can be constructed of for example NiFe or CoFe. The pinned layer 202 can be pinned by exchange coupling one of the ferromagnetic layers 208, 210 with a third layer of antiferromagnetic material (AFM) 212 formed thereunder, The sensor may include one or more seed layers 213 formed under the AFM 212 to assist with achieve proper epitaxial crystal structure of the AFM 212.

The sensor 200 also includes a free layer 214, separated from the pinned layer by a non-magnetic, electrically conductive spacer layer 216. Those skilled in the art will recognize that the present invention could also be practiced with a tunnel valve, rather than a spin valve, in which case the spacer layer 216 would be a thin non-magnetic, electrically insulating layer such as $Al_2O_3$.

The free layer 214 is a synthetic free layer having first and second ferromagnetic layers 218, 220 separated by a second non-magnetic coupling layer 222 such as Ru. The two ferromagnetic layers 218, 220 of the free layer 214 are antiparallel coupled, which improves stability of the free layer. A benefit of the present invention is that a portion of the second ferromagnetic layer 220 serves as a biasing layer for the first ferromagnetic layer 218 as will be described herein below.

With continued reference to FIG. 2, a portion of the second ferromagnetic layer 220 of the free layer 214 extends significantly beyond the lateral sides 204, 206 of the pinned layer 202. That portion of the second ferromagnetic layer 220 of the free layer 214 is exchange coupled with the first and second antiferromagnetic layers 205, 207. It should be appreciated that this exchange coupling occurs only in tie areas where the free layer 214 contacts the first and second antiferromagnetic materials 205, 207 which is significantly outside of the track width region TW of the sensor. This is advantageous, because the second layer 220, of the free layer 214 is strongly pinned in the regions where it is exchange coupled with the antiferromagnetic material layers 205, 207. This pinning does not stop instantaneously at the point where the exchange coupling stops, but rather tapers off gradually. Therefore, if the exchange coupling were extended to the outer edge of the track width TW (ie. to the edge of the active portion of the sensor), the magnetizations of the outer potions of the free layer in the active area would be excessively stiff and the sensor would suffer from insensitivity and non-uniformity of free layer biasing as the effects of the exchange coupling tapered off. This problem becomes even more pronounced as track widths are decreased, as necessitated by ever increasing data capacity requirements.

With continued reference to FIG. 2, the second ferromagnetic layer 220 of the free layer 214 is considerably thicker in the regions outside the active area TW than it is within the active area. In fact the second layer 220 of the free layer 214 is preferably at least 15 percent thicker than layer 218 outside the active area than it is within the track active area. More preferably, the second layer 220 of the free layer 214 is about 20 percent thicker in the outer regions than in within the active area. The thicker second layer 220 of the free layer 214 in the outer regions increases the biasing of the free layer 214 in the outer regions, but decreases the biasing within the active area so as to allow the magnetization of the free layer within the active area to remain free and capable of rotating in the presence of a magnetic field. This construction provides the perfect balance of magnetic stability and free layer sensitivity. The thicker portions 224 of the free layer 214 can be formed by refill processes that will be discussed in greater detail herein below.

The sensor 200 also includes first and second leads 226, 228, which terminate at the outer regions of the active area and extend laterally outward there from. In fact, the leads 226, 228 advantageously define the track width TW of the sensor. Sense current will flow to the sensor through the leads 226, 228 and will pass through the outer portions 224 of the free layer 214 before conducting through the active area of the sensor within the active area of the sensor 200, thereby defining the track width TW. Since the magnetoresitive senor 200 allows detection of a magnetic field by measurement of the electrical resistance through the sensor 200, it is only this active area between the termination of the leads 226, 228 that will contribute to that resistance. As discussed above this advantageously keeps the pinned portion of the free layer 214 sufficiently outside of the active area of the sensor TW to allow substantially constant biasing of the free layer 214 in the active area of the sensor. A capping layer 229, such as Ta, can be provided in the active area of the sensor 200 between the leads 226, 228 to protect and prevent corrosion of the free layer 214.

Figure 3:
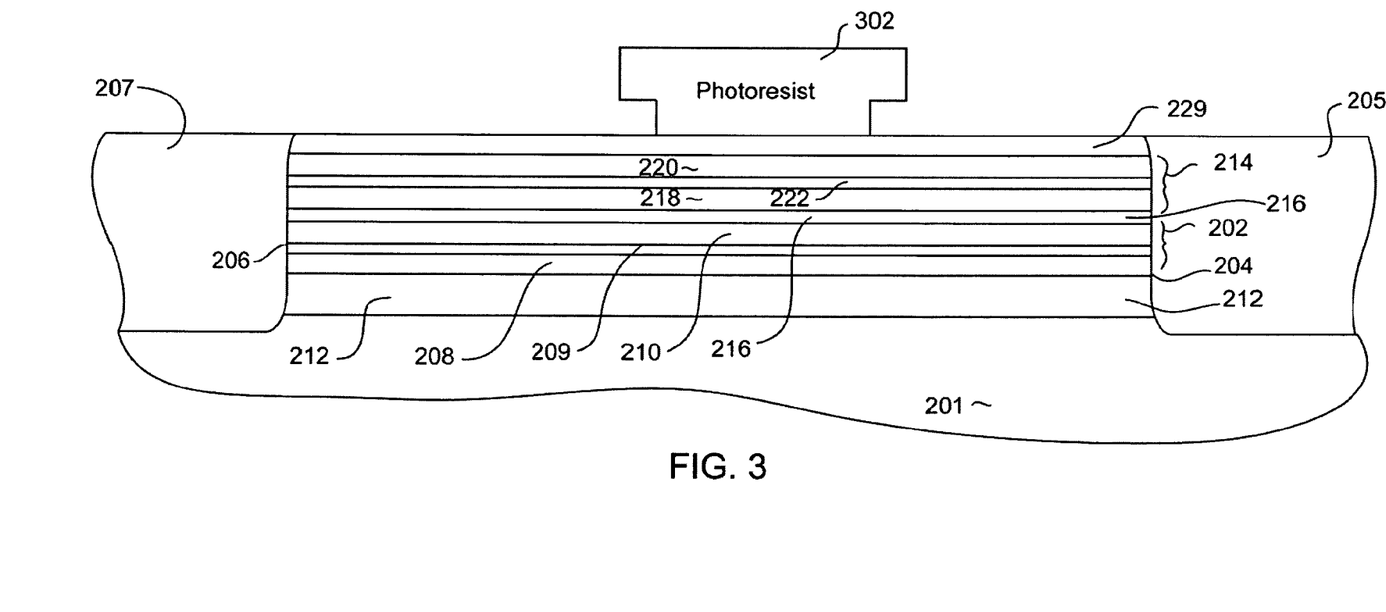
FIGS. 3-6 are ABS view illustrations of the magnetoresistive the sensor of FIG. 2 shown in intermediate stages of manufacture.
Figure 4:
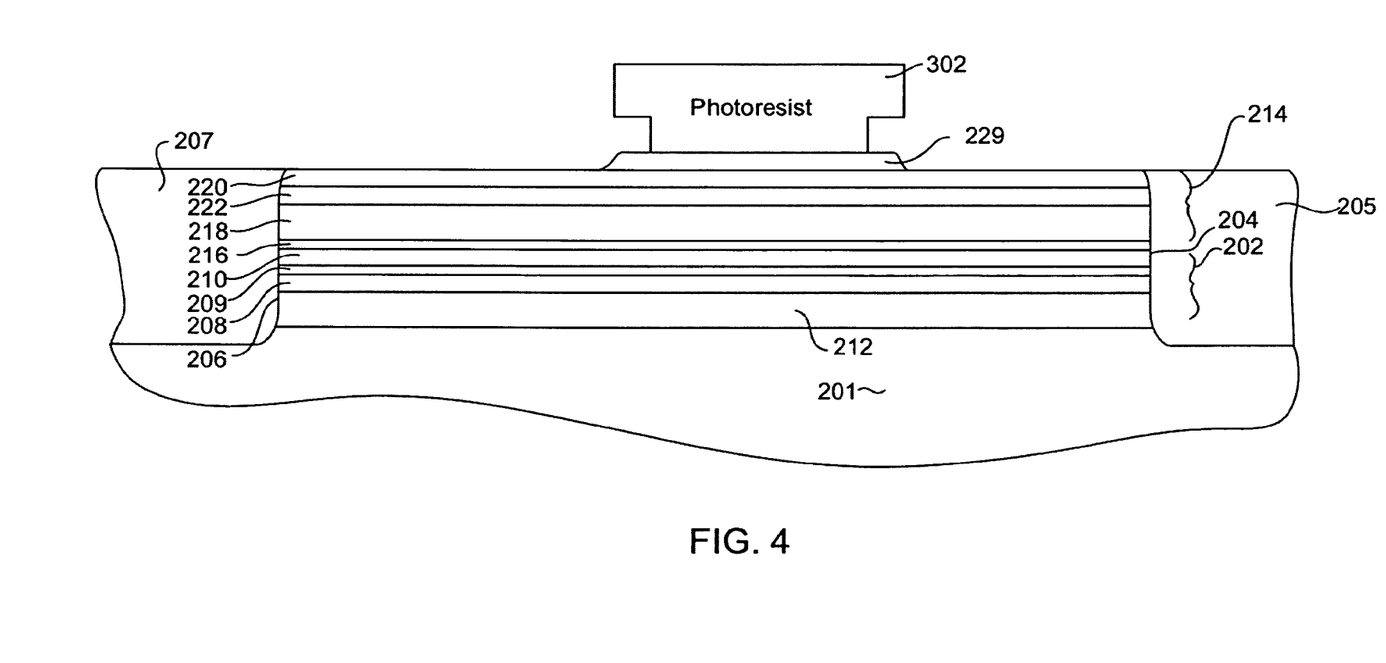

With reference now to FIGS. 3-7, a possible method for constructing the above described sensor will be illustrated. With particular reference to FIG. 3, the third AFM layer 212, pinned layer 202, Cu spacer layer 216, free layer 214, and a Ta capping layer 229 are formed by methods that include, depositing the layers all as full film materials and then masking (not shown) and performing a material removal process (not shown) to form the sides 204, 206. Thereafter, the first and second antiferromagnetic (AFM) material layers 205, 207 are deposited. A CMP process may optionally be performed to form a planar upper surface. A photoresist mask 302 is then formed using photolithographic processes familiar to those skilled in the art, and is formed of a width to generally coincide with the track width TW of the sensor 200. The photo resist mask 302 can be a bilayer photoresist as shown or could be a simple single layer photoresist mask. With reference to FIG. 4, a reactive Ion Etching process (RIE) can then be performed, such as in a $CHF_3$ atmosphere, to remove the portions of the Ta that are not protected by the photoresist mask 302.

Figure 5:
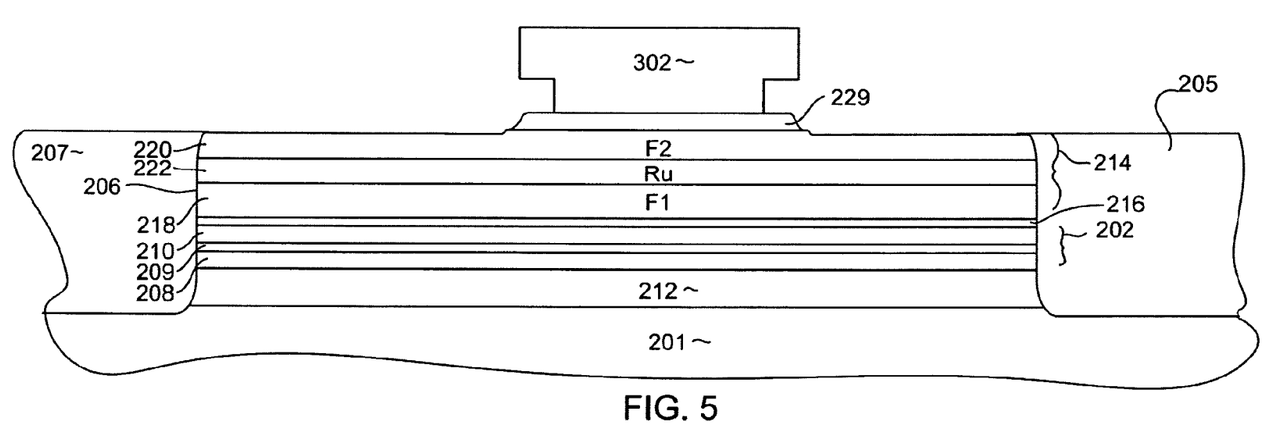
Figure 6:
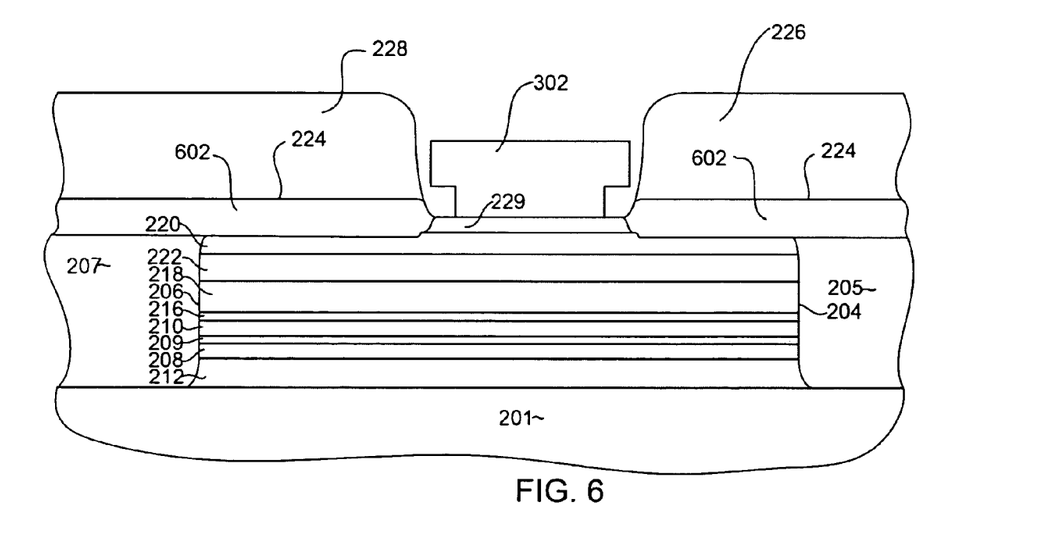

With reference to FIG. 5, another material removal process, such as sputter etching can be used to remove a portion of the second ferromagnetic layer 220. With reference to FIG. 6, ferromagnetic refill material 602 is deposited, preferably of the same material as that making up the previously deposited portion of the second ferromagnetic layer 220 of the free layer, such as NiFe or CoFe. Thereafter the leads 226, 228 can be deposited, such as by electroplating and or sputtering. It will then be an easy matter to remove the photoresist layer 302, resulting in the sensor 200 described with reference to FIG. 2. It should be noted that the processes described above advantageously leave the active portions of the free layer protected and completely unaffected by subsequent process steps such as RIE or sputter etching processes.

Figure 7:
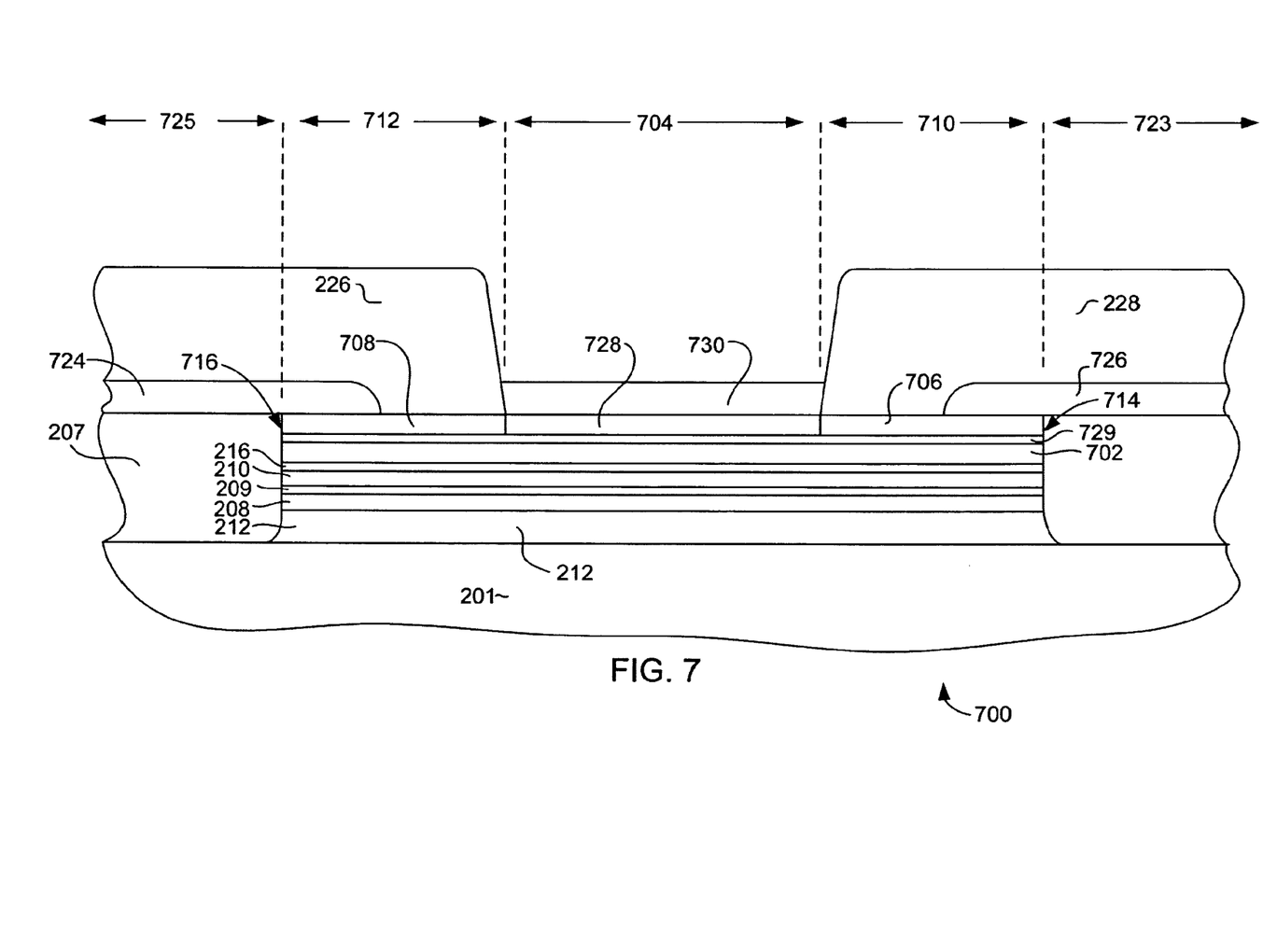
FIG. 7 is an ABS view of a magnetoresistive sensor according to another embodiment of the invention.

With reference now to FIG. 7, a sensor 700 according to another embodiment of the present invention employs a single free layer 702. The sensor 700 has first and second bias layers 706, 708 disposed within first and second intermediate regions 710, 712 that extend from the outer edges of an active region 704 to laterally opposed side walls 714, 716. First and second leads 226, 228 define the outer edges of the track width TW, and of the active area 704, by freely conducting sense current to the outer edges of the active area 704.

The sensor also in includes a pinned layer 202, and a spacer layer 216 which extend substantially beyond the active region of the sensor terminating at the first and second laterally opposed sides 714, 716. First and second antiferromagnetic material layers 205, 207 reside within first and second outer regions 720, 722 abutting the sides 714, 716 of the pinned and free layers 202, 702 and extending laterally outward there from. The antiferromagnetic layers 205, 207 are exchange coupled with third and fourth bias layers 724, 726 formed there over. The third and fourth bias layers 724, 726 have inner termination points disposed within the first and second intermediate regions, and substantially distant from the center or active region 704, and extend laterally outward therefrom. These third and fourth bias layers 724, 726 are exchange coupled with the first and second bias layers 706, 708. A layer of non-magnetic material 728 can be provided in the active region 704, and would be coplanar with and contiguous with the first and second bias layers 706, 708. This non-magnetic layer can be formed of a material that is similar to that of the first and second bias layers 706, 708 except that it has been oxidized to render it non-magnetic and electrically non-conductive. A process for achieving this will be described herein below. Optionally this portion 728 could be completely removed rather than oxidized as will also be described below.

With reference still to FIG. 7, the exchange coupling of the antiferromagnetic layers 205, 207 with the third and fourth bias layers 724, 726 in first and second outer regions 723, 725 strongly fixes the magnetization of the bias layers 724, 726. These third and fourth bias layers 724, 726 are exchange coupled with at least a portion of the first and second bias layers 706, 708, and therefore magnetize these bias layers 706, 708 as well. The first and second bias layers 706, 708 antiferromagnetically couple with the free layer 702 in a direction antiparallel with the magnetization of the bias layers 706, 708. This antiparallel coupling is caused by magnetostatic coupling across the coupling layer 729 formed between the free layer 702 and the bias layers 706, 708. The coupling layer 729 could be for example Ru. A capping layer, 730, can be provided between the leads 226, 228.

Figure 8:
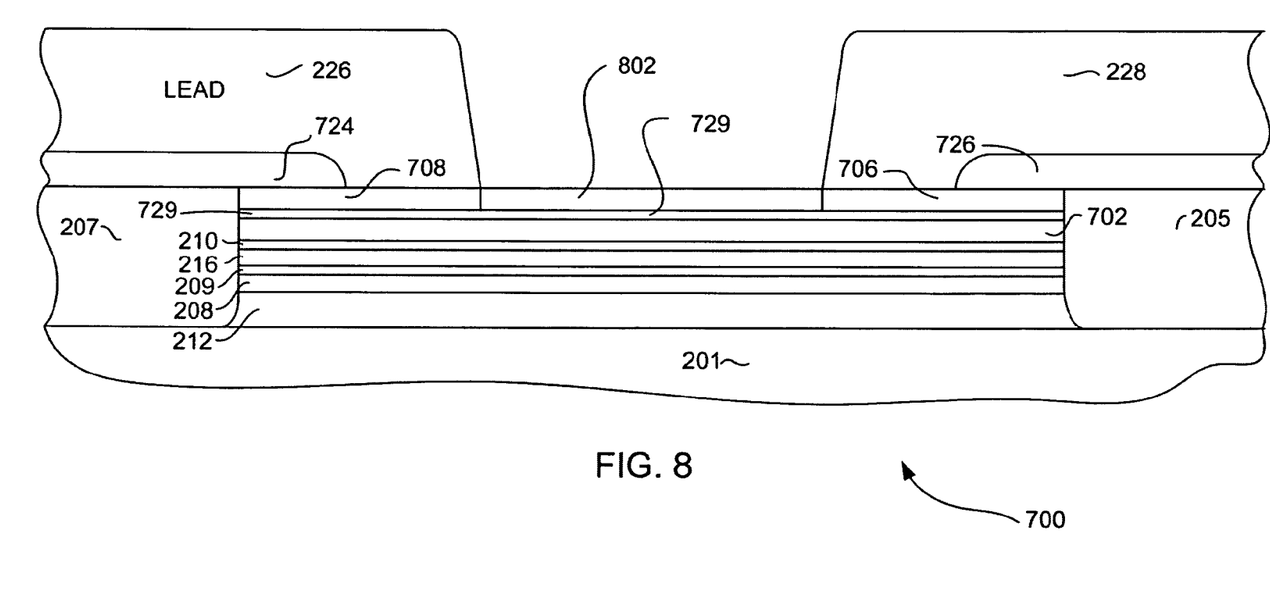
FIG. 8 is an ABS view of the magnetoresistive sensor of FIG. 7 shown in an intermediate stage of manufacture.

With reference to FIG. 8, in order to construct a sensor 700, according to the embodiment described above, first the AFM 212 pinned layer 202, free layer 702 and spacer layer 216 are formed. Then, the Ru coupling layer 729 layer and a magnetic layer 802 are deposited on top of the free layer. The third and fourth bias layers 726, 224 can then be formed by a photolithographic process employing a photoresist mask (not shown). There after the leads can be formed also by a photolithographic process using a smaller mask (also not shown). After the mask used to form the leads 226, 228 has been removed, a RIE process can be used to remove ferromagnetic material, using the leads as a mask to only remove the portions of the ferromagnetic layer 802 in the active region 704. This advantageously, eliminates the magnetostatic coupling in the active region leaving the first and second bias layers 706, 708 to magnetostatically couple with the free layer only in the inactive intermediate regions 710, 712.

Figure 9:
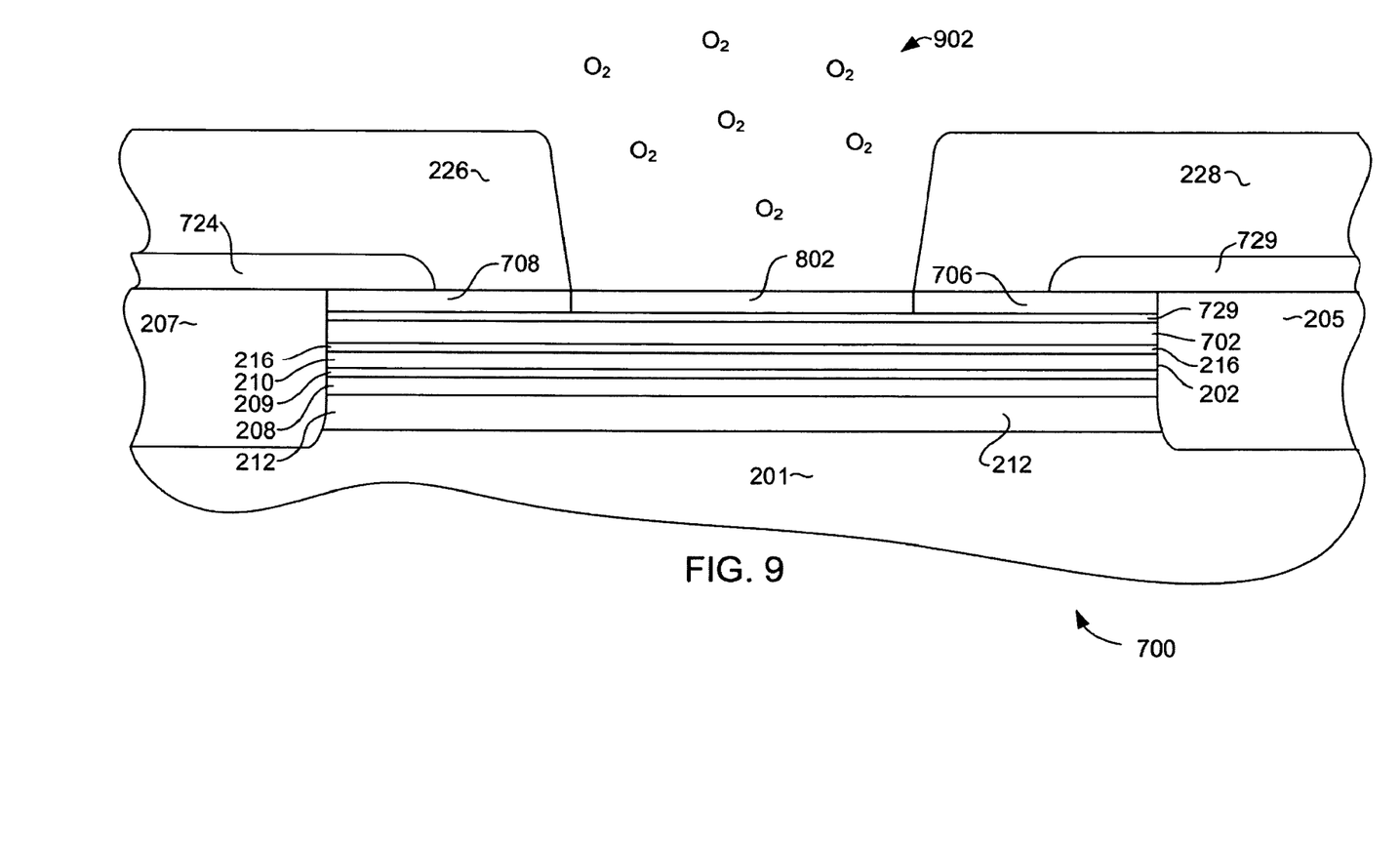
FIG. 9 is an ABS view of a magnetoresistive sensor according to yet another embodiment of the invention in an intermediate stage of manufacture.

With reference now to FIG. 9, a method for constructing another embodiment described above is illustrated. The AFM 212 pinned 202, spacer 216, free 702, hard bias 802 and leads 226, 228 are formed as described above. First the Ta cap layer 730 is removed by the RIE process, then, the sensor 700 is exposed to an atmosphere 902 that will oxidize exposed portions of the ferromagnetic layer 802. Such an atmosphere could be for example, water vapor, oxygen or air. This will oxidize only the exposed portion of the ferromagnetic layer that exists in the desired active area of the sensor. The oxidation of the ferromagnetic material in the active area of the sensor renders that portion of the ferromagnetic material non-magnetic and electrically non-conductive. A preferred material for use as a ferromagnetic material could be CoFe which oxidizes readily, or could be CoNiFe, or NiFe.

Figure 10:
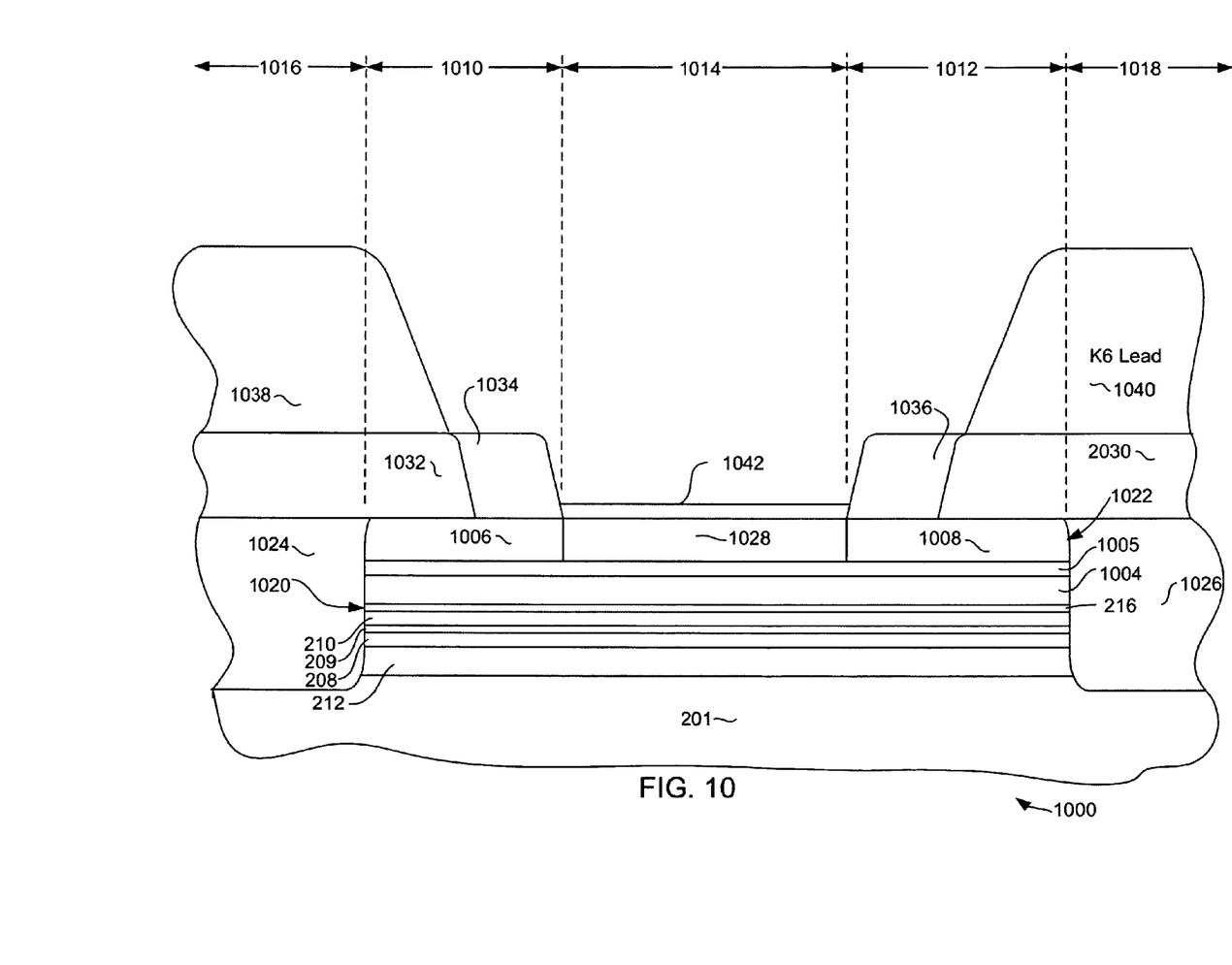
FIG. 10 is an ABS view of a magnetoresistive sensor according to still another embodiment of the invention.

With reference now to FIG. 10, yet another embodiment of the invention is described. The sensor 1000 includes a pinned layer 202, and a spacer layer 216 as before. The sensor 1000 also includes a free layer 1004 having a non magnetic coupling layer 1005 formed there over. Ferromagnetic bias layers 1006, 1008 are formed over the free layer 1004 in intermediate regions 1010, 1012. The sensor also includes an active region 1014, and first and second outer portions 1016, 1018. The pinned, spacer, free, 20 coupling, and bias layers 202, 216, 1002, 1004, 1006, 1008 form first and second side walls 1020, 1022 at the juncture between the intermediate 1010, 1012 and outer portions 1,016, 1018. Optionally, first and second layers of electrically conductive lead material 1024, 1026 can be formed to abut the first and second side walls 1020, 1022, and extend laterally there from. Such lead layers 2024, 2026 would preferably have an upper surface that is coplanar with an upper surface of the bias layers 1006, 1008.

With continued reference to FIG. 10, a non-magnetic, electrically non-conducting material layer 2028 is formed between the bias layers 1006, 1008, and is coplanar therewith. The non-magnetic electrically non-conducting layer can be deposited along with the bias layers 1006, 1008 as a single material layer and then oxidized in a manner similar to that described with reference to FIGS. 7 and 9.

First and second antiferromagnetic material layers 1030, 1032 are then formed over the bias layers 1006, 1008 and leads 2024, 2026. The antiferromagnetic material layers 2030, 2032 are formed with terminations in the intermediate regions, some distance from the active area, and extend laterally there from. Third and fourth lead layers 1034, 1036, preferably formed of Rh, can be provided between the termination of the ferromagnetic layers 1030, 1032 and the active area 1014 of the sensor. In addition, fifth and sixth lead layers 1038, 1040 can also be provided over the antiferromagnetic layers 1030, 1032 to provide additional sense current conduction to the sensor. Those skilled in the art will appreciate that the Rh third and fourth leads advantageously provide separation between the pinned portion of the bias layers 1006, 1008 and the active portion of the sensor. A Ta cap 1042 may be provided over the active portion of the sensor to protect the sensor from corrosion.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of constructing a magnetoresistive sensor, comprising:
   depositing a ferromagnetic pinned layer;
   depositing a nonmagnetic spacer layer;
   depositing a ferromagnetic film;

depositing a Ta film;

forming a mask over a track width area, the mask leaving an area outside of the track width area unprotected by the mask;

performing a reactive ion etch process to remove portions of said Ta layer that are not protected by the mask;

performing an etch process to remove only a portion of said ferromagnetic film in areas that are not protected by the mask, leaving a portion of the ferromagnetic film remaining in the areas that are not protected by the mask; and depositing ferromagnetic refill material.

2. The method as in claim 1 wherein the etch process is a sputter etch process.

3. A method for manufacturing a magnetoresisitve sensor, comprising:

forming a sensor structure that includes a magnetic free layer structure and a Ta layer formed over the magnetic free layer structure, the sensor structure having first and second laterally opposed sides;

depositing a layer of antiferromagnetic material at the first and second sides of the sensor structure;

forming a mask structure over the sensor structure;

performing a reactive ion etching to remove portions of the Ta layer that are not protected by the mask structure;

performing a sputter etch to remove a portion of the magnetic free layer structure in an area not protected by the mask structure, the sputter etch being insufficient to remove all of the antiferromagnetic material; and depositing a magnetic material.

4. The method as in claim 3 further comprising, after depositing a magnetic material to cover a portion of the magnetic free layer and at least a portion of the layer of antiferromagnetic material, depositing an electrically conductive lead material.

5. The method as in claim 3 wherein the free layer structure comprises first and second magnetic layer separated by a layer of non-magnetic material.

6. The method as in claim 3 wherein the free layer structure comprises first and second magnetic layers separated by a layer of non-magnetic material, and wherein the sputter etching removes a portion of the second magnetic layer and is terminated prior to reaching the non-magnetic layer.

7. The method as in claim 3 wherein the sputter etching removes a portion of the magnetic free layer that is unprotected by the mask structure, and wherein the sputter etching is terminated before all of the unprotected portion of the magnetic free layer has been removed.

8. The method as in claim 3 wherein the layer of antiferromagnetic material is exchange coupled with a portion of the magnetic free layer deposited thereover.

9. The method as in claim 3 wherein the layer of antiferromagnetic material is exchange coupled with a portion of the magnetic layer deposited thereover, and wherein the exchange coupling pins a magnetization of the portion of the magnetic free layer deposited thereover.

10. The method as in claim 3 wherein the free layer structure comprises a single layer of magnetic material.

11. The method as in claim 3 wherein the mask structure is a bi-layer mask structure having an overhanging portion.

* * * * *